3 Sheets—Sheet 1.
H. HULL.
GRAIN-BINDER.
No. 190,041. Patented April 24, 1877.
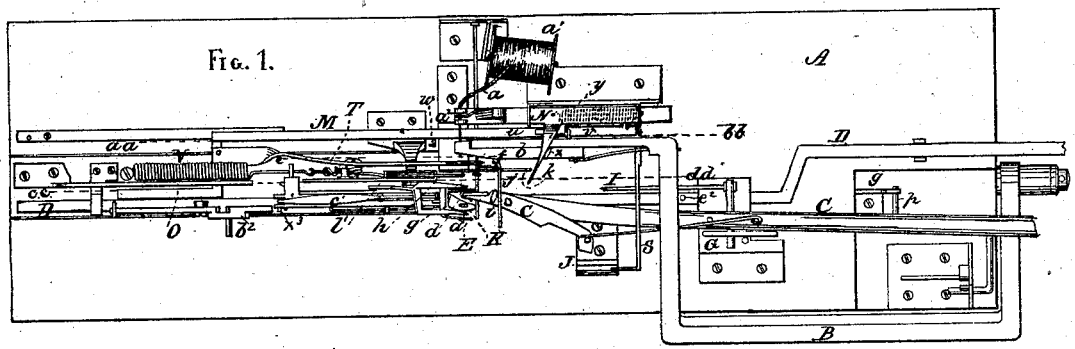
Fig. 1.
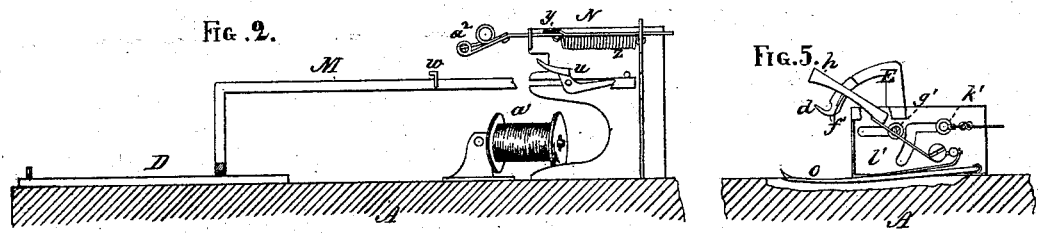
Fig. 2.
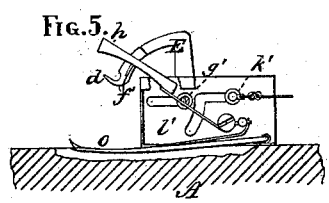
Fig. 5.
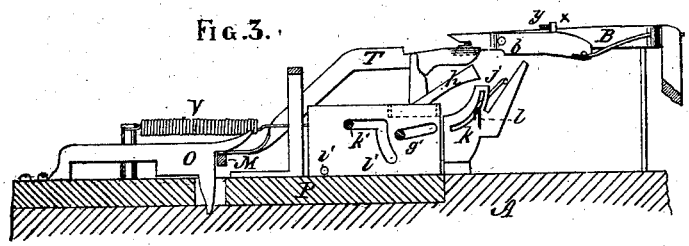
Fig. 3.
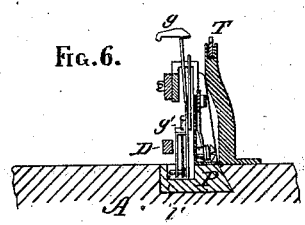
Fig. 6.
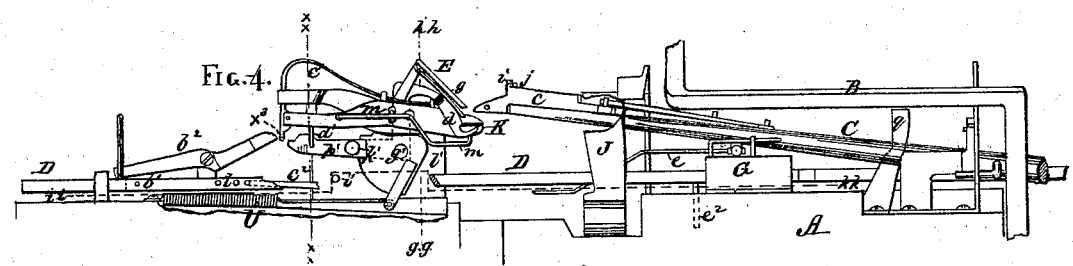
Fig. 4.
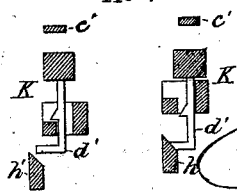
Fig. 4½.
WITNESSES:
Edw. W. Byrn
Solon C. Kemon
INVENTOR:
Harvey Hull
BY
ATTORNEYS.
N. PETERS, PHOTO-LITHOGRAPHER, WASHINGTON, D. C.

3 Sheets—Sheet 2.
H. HULL.
GRAIN-BINDER.
No. 190,041. Patented April 24, 1877.
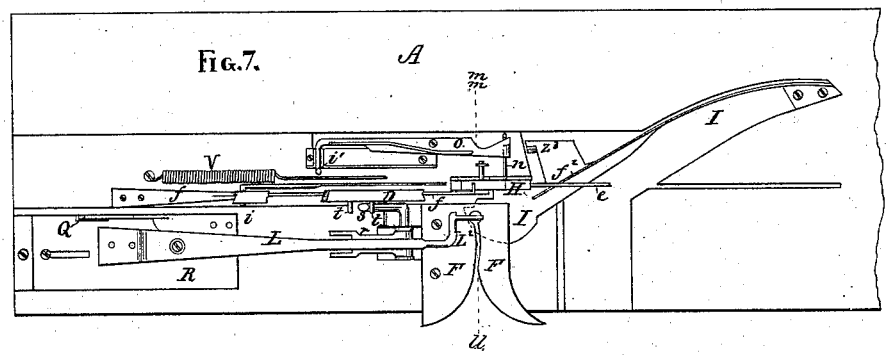
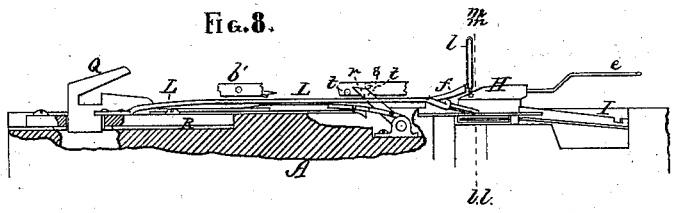
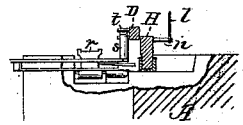
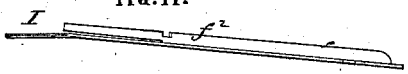
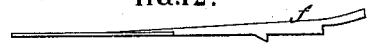
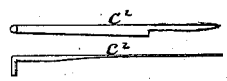
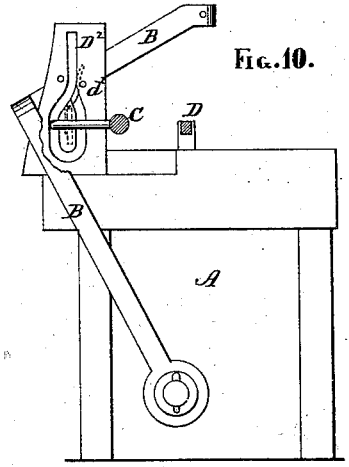
WITNESSES:
Edw. B. Byrne
Colon Kennon
INVENTOR:
Harvey Hull
BY
ATTORNEYS.
N. PETERS, PHOTO-LITHOGRAPHER, WASHINGTON, D. C.

H. HULL.
GRAIN-BINDER.
No. 190,041 Patented April 24, 1877.
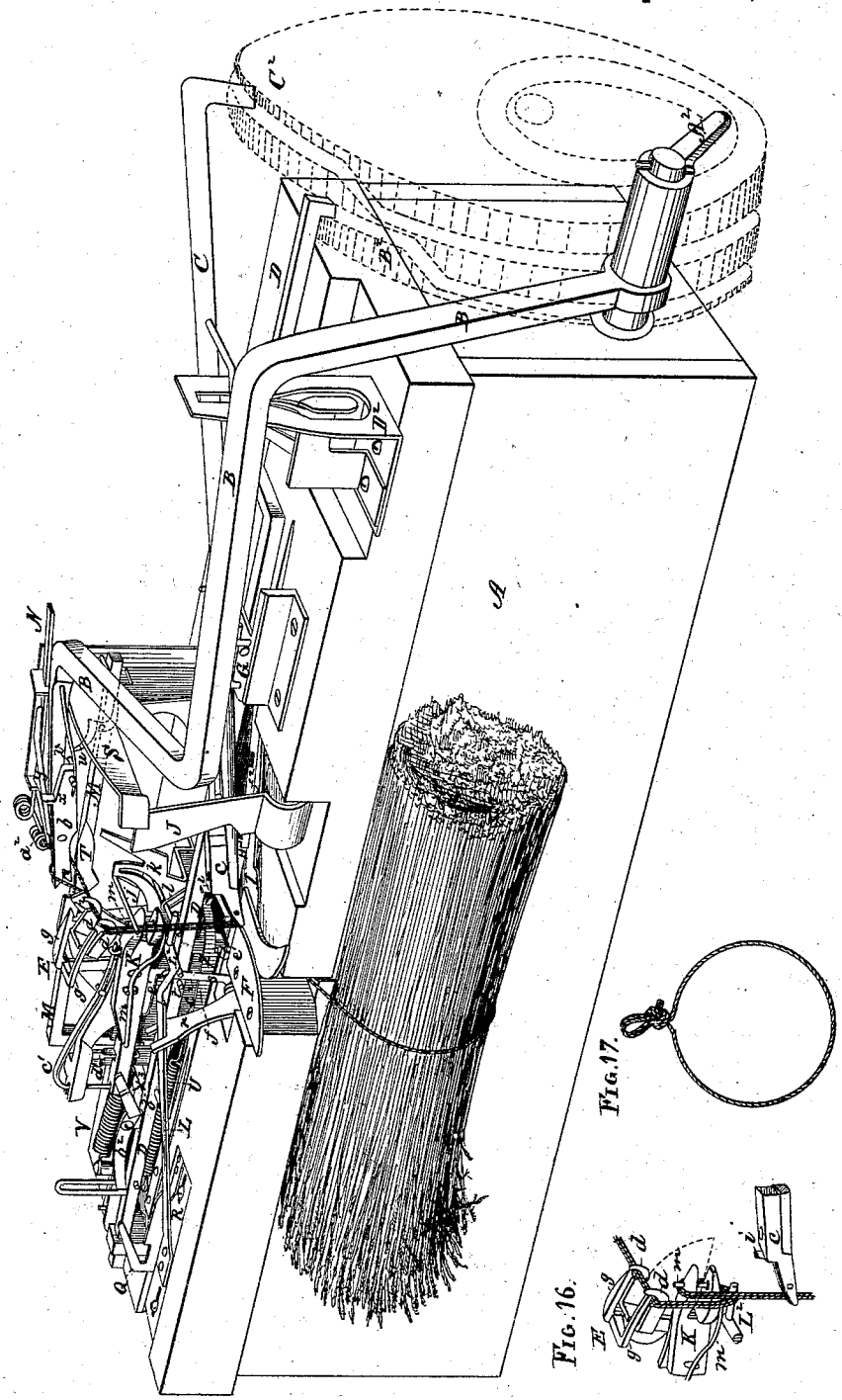
3 Sheets—Sheet 3.

UNITED STATES PATENT OFFICE.

HARVEY HULL, OF WEST EXETER, NEW YORK.

IMPROVEMENT IN GRAIN-BINDERS.

Specification forming part of Letters Patent No. 190,041, dated April 24, 1877; application filed February 28, 1877.

*To all whom it may concern:*

Be it known that I, HARVEY HULL, of West Exeter, in the county of Otsego and State of New York, have invented a new and Improved Grain-Binder; and I do hereby declare that the following is a full, clear, and exact description of the same, reference being had to the accompanying drawings, forming part of this specification, in which—

Figure 1 is a plan view of the parts above the line $i\ i\ k\ k$ of Fig. 4; Fig. 2, a vertical section through $a\ a\ b\ b$ of Fig. 1; Fig. 3, a vertical section through $c\ c\ d\ d$ of Fig. 1; Fig. 4, a partial front elevation of Fig. 1. Fig. $4\frac{1}{2}$ is a transverse section through line $x\ x\ x\ x$ of the tying-pinchers, showing the opened and closed portions of the same; Fig. 5, detail side view of plate $l'$, with part of gripers; Fig. 6, a transverse section through $g\ g\ h\ h$ of Fig. 4; Fig. 7, plan of devices below line $i\ i\ k\ k$ of Fig. 4; Fig. 8, front elevation of Fig. 7, with base in section; Fig. 9, a vertical transverse section through $l\ l\ m\ m$ of Figs. 7 and 8; Fig. 10, an end elevation from the right; Fig. 11, detail of spring-arm I; Fig. 12, detail of latch-bar $f$; Fig. 13, details of setting-bar $c^2$; Fig. 14, detail of forked arm $j$; Fig. 15, a perspective view of the entire machine, with driving devices in dotted lines; Fig. 16, a detail of the leading devices, showing the tying of the knot; Fig. 17, form of knot (single bow) tied by the binder.

My invention relates to a novel construction of machine for binding grain into bundles by means of a cord fed from a reel, which cord is first wrapped around the gavel, and then tied into a single-bow knot, as hereinafter fully described.

In the drawing, A represents the base-frame, upon which the devices are mounted. This frame is arranged in connection with a harvester, so as to receive the cut grain by the side of the same, (see Fig. 15,) and with the straws of the gavel parallel with the frame and at right angles to the cord, and upon the same, which cord is dropped down upon this side by means of a rock-arm carrying pinchers, which hold the cord.

In the machine about to be described there are three leading instrumentalities or main sources of motion. The first of these, in the order of its operation, is a rock-arm, B, Figs. 1, 3, 4, 10, 15, provided with carrying pinchers $b$, which seize the cord from a reel, and rock to carry the cord around the gavel and back. The second is a compound bar, C, carrying looping-pinchers $c$, which has a rectilinear advance movement to seize the ends of the cord around the gavel, and also a revolving movement at its ends upon its intermediate fulcrum to loop the ends of the cord around the pinchers of a set of tying devices. The third is a reciprocating slide, D, running the whole length of the machine, and carrying the tying-pinchers, with co-operating devices.

The devices being in the position shown in Fig. 1, the rock-arm B, with carrying-pincers $b$, having seized cord $a$, fed from reel $a^1$ through tension $a^2$, drops down with cord, the latter falling into the hooks $d$ of gripers E, Figs. 1, 4, 15, and into the curved throat-plate F, Figs. 7 and 15. The rock-arm continues its downward movement until the cord is low enough to receive the gavel or bunch of grain, which is delivered crosswise upon the cord. The rock-arm then commences to rise, drawing the cord around the gavel to bring it in the form of a bundle, and, in rising, carries the end of the cord into the slot of the throat-plate F, so that the bundle is suspended below the throat-plate, and the two portions of the cord hang vertically in the slot-plate, while the rock-arm, with pinchers, returns over curved guide S to its position beside the tension $a^2$, Fig. 15. The compound bar C then advances longitudinally upon its fulcrum-guide support G, Figs. 1, 4, 15, and forces cam-trigger H, attached to bar C by rod $e$, Figs. 1, 4, 8, past a lug, $z^3$, Fig. 7, on a horizontal spring-arm, I, whose end then slides under throat-plate and forces the two cords into a position to be seized by the looping-pinchers $c$ of bar C, Fig. 15. At the same time cam-trigger H slides under and lifts a releasing-latch, $f$, Figs. 8 and 12, which, by means hereinafter described, allows the hook $g$ and tension-arm $h$ of gripers E, Figs. 1, 4, 5, 6, 15, to descend upon the cord and catch it between the lower hooks $d$ and the upper ones $g$, Fig. 16. As the bar C advances, also, its spring-pinchers are held open by the extension of one jaw, which bears against an upright plate, J. As the bar and pinchers advance beyond said plate, however, the spring-pinchers close upon the two cords held in the throat-plate, and the end of pinchers carrying cords commences to revolve to loop the cord around the tying-pinchers K, Figs. 15 and 16. As the looping-pinchers $c$ rise, a lug, $i$, upon top of same, Figs. 1, 4, 15, catches one branch of a forked arm, $j$, moving in curved guides $k$, Figs. 1, 3, 14, 15, and as this arm is lifted it holds the loop of the double cord into position to be thrown around the tying-pinchers by the looping-pinchers $c$. As the loop is being formed around the tying-pinchers it is necessary that the cords below should be held tightly, and, therefore, when the pinchers $c$ are at their highest point with the cord, in passing the latter around the tying-pinchers a link, $l$, connecting the lower branch of forked arm $j$ with the cam-trigger H, Figs. 3, 8, 9, 15, lifts said trigger partially in its guide above flange $f^2$, Fig. 15, and allows the spring-arm I to press close upon the cords beneath the throat-plate and hold them tightly therein. The object of thus clamping the cord at this point and time is partly to hold this end of the cord tight while the knot is being tied, and also to hold the cords close together, so that the knot can be forced down close to the bundle by the hook $L^2$ without allowing the cord to slip back through the throat-plate from the weight or expansion of the bundle. As a modification of the spring-arm I, and in the place thereof, I may use a separate pair of pinchers or other clamping or griping device. After pinchers $c$ have passed around tying-pinchers and left the loop thereon retained by a spring-catch rod, $m$, Fig. 16, the pinchers $c$ release the cord, being opened by the contact of the extension of one of the jaws with the upright plate J. The compound bar C, carrying looping-pinchers $c$, now begins to move backward in a straight line, and in carrying cam-trigger H back a hook, $n$, on the latter strikes a lever-catch, $o$, Fig. 7, and, through devices hereinafter described, permits the gripers E holding cord to descend upon a level with the open mouth of tying-pinchers, and then to move back, as in dotted lines of Fig. 16, inserting its cord into mouth of tying-pinchers, raising upper hooks $g$, unlatching the jaws of tying-pinchers, (so as to allow them to grasp the cord delivered by gripers,) and depressing the spring-catch rod $m$, so as to allow the tying-pinchers to pull the cord (delivered to them by gripers) through the loop formed around the tying-pinchers by the pinchers $c$, and allow said loop to slide off, after which compound bar C and looping-pinchers $c$ return to their original position, a pin, $p$, on bar C engaging with a curved arm, $q$, Figs. 1 and 4, to draw the said bar back.

When the loop is formed around the tying-pinchers it is also formed around the hook $L^2$ of a spring-arm, L, Figs. 7, 8, 15, 16, which hook is raised to an adjacent position beside the tying-pinchers by a short shaft and the rock-arms $r\ s$, of which $r$ lifts the spring-arm through the action of pins $t$ on slide D, upon $s$. As soon, therefore, as the tie is formed and the slide D moves forward the spring-arm L drops, and, as its hook is in the knot formed, it draws the knot down close to the bundle beneath the throat-plate.

Then, as slide D moves farther forward a pivoted cam or dog, $u$, Figs. 1, 2, 15, on a slide-arm, M, attached to slide D, slides over hook $v$, Figs. 1 and 5, on rock-arm carrying pinchers $b$, and opens said pinchers, while at the same time hook $w$, Figs. 1 and 2, on slide-arm M, pulls out the free terminal end of cord from the pinchers preparatory to taking a new hold upon the cord.

The carrying-pinchers $b$, it will be remembered, after carrying the cord around the bundle returned to their original position, and in thus returning a lug, $x$, on pinchers $b$, Figs. 1, 3, 15, forces forward the cord-slide N, carrying the tension $a^2$, by forcing the arm $y$, Figs. 2, 3, and 15, against the pressure of spring $z$, Fig. 2, of cord-slide N, thus bringing the reel end of cord into a position in front of pinchers $b$.

Now, when the carrying-pinchers $b$ are opened by the dog $u$ on slide-arm, Fig. 15, the lug $x$ being moved out of the way of arm $y$, the spring $z$ brings slide N, tension $a^2$, and its cord, back, and inserts the cord into the open mouth of pinchers, which close upon the cord after the dog $u$ passes the hook $v$ on the pinchers $b$. Thus, after the bundle is tied, the pinchers $b$ release the terminal end of cord and seize the cord between the bundle and the reel.

Then, as the slide D passes still farther forward, the attached knife T, which is fastened to a spring-arm, and provided with a cam on its bottom side, Figs. 3 and 15, rides over a guide-standard, and in rising and sliding cuts the cord between the pinchers $b$ and the bundle, which latter is suspended then only by the hook $L^2$ of the spring-arm L, and as the slide D still advances slide-arm M strikes the inclined edge of detent O, Fig. 3, and allows the base-slide P, Figs. 3 and 6, to move back, together with all of the parts, until a pin, $b^1$, on the side of slide D, Figs. 4 and 15, strikes the spring-latch Q, Figs. 8 and 15, of the sliding base-plate R, to which the spring-arm L is attached, and, the spring-arm and its hook being drawn back, the bundle, which is tied and severed, falls to the ground tied with a cord in a single bow-knot, as shown in detail in Fig. 17.

As the return or backward movement of the slide D effects the setting or bringing into their original position the tying devices mounted upon base-slide P, before describing the effect of said return movement a more specific description of said devices will be necessary, and in which description reference is more particularly made to Figs. 3, 4, 4½, 5, 6, 7, 8, 11, 12, 13.

The tying-pinchers K are closed by a spring, $c'$, Figs. 4 and 15, whose lower end is rigidly fastened to the lower extension of the pinchers, and bent at $x^3$, so as to form a lateral projection, upon which a pressure may be exerted to open the jaws of the pinchers. The said jaws are held open by a spring-detent, $d'$, Figs. 4 and 4½, which projects so as to be struck by a tripping device at the proper time. The jaws of the tying-pinchers are perforated, and in the said perforation is arranged the end of the spring-catch rod $m$, Figs. 4, 15, and 16, which catch-rod is so arranged as to project above the upper surface of the pinchers when the latter are open, and be below the same when the pinchers are closed, the object of which arrangement is to hold the loop over the pinchers when open, so that the pinchers may seize the cord to be drawn through the loop, and to permit the loop to slip off when the pinchers close, and the said cord is drawn through, Fig. 16.

Just above the pinchers are arranged the gripers E, Figs. 4, 15, 16, which hold the cord that is to be drawn through the loop around the tying-pinchers. These gripers first close upon the cord, then descend to the level of the pinchers, and then move back to insert the cord into the pinchers.

First, (with respect to closing the gripers,) the upper hooks $g$ and lower hooks $d$ of the same are pivoted upon the same center $g'$, Figs. 3, 4, 5, 6, and, when the gripers descend, move together, but have an independent motion, their lower ends being connected with a spiral spring, U, Figs. 4 and 15, which (when the latch $f$ is raised from a pin, $e^1$, below the pivot of said hook by the cam-trigger H, Figs. 7, 8, 12, and 15,) serves to bring hooks $g$ of gripers down upon the cord lying upon $d$. At the same time that $g$ descends, also, its beveled side strikes the spring tension-arm $h$, Figs. 5, 6, 15, and, pushing the latter to one side, and off of its rest $f^1$ on the side of hooks $d$, the said tension-arm $h$ presses upon the cord, to hold it taut.

Secondly, (with respect to the descent of the gripers,) the hooks $d$, below the pivot $g'$, are provided with an arm, $h'$, Fig. 4, which, together with the pin $i'$, Figs. 3 and 4, upon the end of lever-catch $o$, Fig. 7, holds the gripers from moving upon pivot $g'$ from the tension of spring U; but, when hook $n$ on cam-trigger H, Fig. 7, deflects lever-catch $o$ and withdraws pin $i'$, from arm $h'$, spring U, Fig. 4, then turns the gripers upon pivot $g'$, and brings the cord into line with tying - pinchers K, Fig. 16. (Curved dotted lines.)

Thirdly, (with respect to insertion of cord into tying - pinchers by gripers,) at the last part of the movement just described a spiral spring, V, Figs. 1, 3, 7, and 15, draws back the gripers integrally, their pivots $g'$ $k'$, Fig. 3, moving back in the inclined and horizontal slots of the plate $l'$, Figs. 3 and 5, to draw back the gripers and insert the cord into the tying-pinchers, (Fig. 16, straight dotted lines,) while the upper hooks arise from the lower ones, and the arm $h'$ strikes the detent $d'$, Figs. 4 and 4½, (which holds the jaws of the pinchers open,) which jaws then immediately close upon the cord that the gripers have inserted between the same.

To resume the description of the joint operation of the devices, it will be remembered that the rock-arm B, with pinchers $b$, and the compound bar C, with its pinchers, had both completed their function, while the slide D had effected only its advance movement. In moving back, the slide D effects the following results: First, its pin $b^1$ strikes the spring-latch Q, Figs. 4, 8, and 15, advancing the sliding base R, with its spring-arm L, so as to bring the terminal hook of said arm up to the throat-plate, the spring-latch Q then dropping down into a notch, where it is out of the way of the pin $b^1$, and holds also the spring-arm to its place; secondly, a pivoted cam-bar, $b^2$, Figs. 4 and 15, on slide D engages with and forces downwardly the bent projection $x^3$ of spring $c^1$, thus opening the jaws of the tying-pinchers, which are held open by the spring-detent $d^1$, Fig. 4½; thirdly, a setting-bar, $c^2$, pivoted to the inner portion of slide D, and having a notch in its free end, Figs. 4, 13, and 15, slides through a strap in the lower part of the gripers below the pivot $g'$, and forces the said gripers back to set them, until a pin, $e^1$, below the pivot $g'$, catches beneath the latch $f$, Figs. 6, 12, and 15, to hold them in position, the upper hooks $g$ of the gripers being carried back first to leave the lower ones open to receive the cord, and the lower ones being then carried back by a lug depending from the upper hooks; fourthly, the pins $t$ on slide D, Figs. 4, 7, 8, and 15, strike the arm $s$ and cause $r$ to raise spring-arm L, and its terminal hook $L^2$, to a position adjacent to the tying-pinchers; fifthly, a depending pin, $e^2$, (of slide D,) Fig. 4, strikes a flange, $f^2$, Figs. 7, 11, and 15, on spring-arm I, and forces the latter back, so as to allow its lug $z^3$, Fig. 7, to be caught and held by the cam-trigger H; sixthly, the base-slide P, Figs. 3 and 6, with its tying devices, is brought into position near the carrying and looping pinchers, and the machine is ready for a repetition of the operation before described.

So far, no means have been described for imparting the necessary motion to the three main operating devices. A suitable provision, however, is shown in dotted lines, in which an arm or extension, $A^2$, plays in a cam-groove, and operates the rock-arm B; a plain cam-groove in a boss or hub, $B^2$, imparts, through a pin, a sliding motion to the slide D, and a cam-groove upon an eccentric portion of the hub $C^2$ gives the compound sliding and rotary motion to the looping-pinchers, while the bar C, carrying said pinchers, is guided in its motion by an arm playing in a slotted guide, $D^2$, which guide is provided with a spring-leading tongue or switch, $d^2$, Figs. 10 and 15, for insuring the revolution of the bar in the right direction.

Having thus described my invention, what I claim as new is—

1. The combination of the carrying-pinchers $b$, the looping-pinchers $c$, the tying-pinchers K, the gripers E, and the knife T, substantially as and for the purpose described.

2. The combination, with the tying-pinchers K, of a catch, $m$, arranged to hold the loop while it is being formed, and to be withdrawn into the limits of the loop to allow the same to slip off when the pinchers are closed, as and for the purpose described.

3. The combination, with the tying-pinchers K, of the gripers E, composed of independent pivoted hooks $g$ and $d$, arranged to clamp the cord, to move together in line with pincher-jaws, and backward into the same, substantially as described, and for the purpose set forth.

4. The fulcrum-bar C, carrying looping-pinchers, and having a compound motion, in combination with the slotted guide $D^2$, having a spring leading tongue or switch, $d^2$, substantially as and for the purpose described.

5. The combination of cam-trigger H, connected with bar C, the horizontal spring-arm I, or its equivalent, as described, and throat-plate F, as and for the purpose specified.

6. The combination, with the tying-pinchers, of a hook, $L^2$, for drawing the knot down to the bundle, substantially as described.

7. The combination of slide D, having pins $t$ and $b^1$, the spring-latch Q, sliding plate R, spring-arm L, and rock-arms $r$ $s$, as and for the purpose described.

8. The combination of the cam-trigger H with the releasing-latch $f$, and the pivoted spring-actuated gripers E, substantially as described.

9. The tension-arm $h$, in combination with the gripers E, tying-pinchers K, and looping-pinchers $c$, for the purpose described.

10. The combination, with the tying-pinchers K, of the looping-pinchers $c$, having lug $i$, and a forked arm, $j$, for the purpose of placing the loop around the tying-pinchers, as described.

11. The link $l$, in combination with the forked arm $j$, the spring-arm I, and the cam-triggers H, as and for the purpose described.

12. The combination, with the pivoted spring-actuated gripers, of the lever-catch $o$ and the cam-trigger H, having hook $n$, substantially as and for the purpose described.

13. The slide-arm $m$, moving with slide D, and having a pivoted cam or dog, $u$, and hook $w$, in combination with the carrying-pinchers $b$, having lug $x$ and hook $v$, together with the spring-actuated cord-slide N, carrying tension $a^2$ and arm $y$, substantially as described, and for the purpose set forth.

14. The sliding knife T, having a cam upon its under surface, and moving in a stationary guide-standard, combined with, and located between, the carrying-pinchers $b$ and the gripers, substantially as and for the purpose described.

15. The combination, with the knife, the tying-pinchers, and its adjuncts, of the sliding arm M, the latch-detent O, the base-slide P, and the notched base-frame, as and for the purpose described.

16. The combination with the spring-actuated tying-pinchers K, of the pivoted cam-bar $b^2$, arranged upon the slide D to open the tying-pincher jaws, as described.

17. The gripers E, having arm $h'$, in combination with the lever-catch $o$, having pin $i$, and the detent $d^1$, which holds open the tying-pincher jaws, for the purpose described.

18. The notched setting-bar $c^2$, pivoted to the slide D, and combined with the griping devices, to set the same against the tension of the springs, substantially as described.

19. The slide D, having pendent pin $e^2$, in combination with the spring-arm I, having flange $f^2$, as and for the purpose set forth.

HARVEY HULL.

Witnesses:
SOLON C. KEMON,
CHAS. A. PETTIT.